United States Patent
Frielink et al.

(10) Patent No.: US 7,286,850 B2
(45) Date of Patent: Oct. 23, 2007

(54) WIRELESS COMMUNICATION MODULE SYSTEM AND METHOD FOR PERFORMING A WIRELESS COMMUNICATION

(75) Inventors: Frans Frielink, Nieuwegein (NL); Frans Willem Hoekstra, Elst (NL); Maarten Visee, Houten (NL)

(73) Assignee: Agere Systems Inc., Allentown, PA (US)

(*) Notice: Subject to any disclaimer, the term of this patent is extended or adjusted under 35 U.S.C. 154(b) by 160 days.

(21) Appl. No.: 10/441,886

(22) Filed: May 20, 2003

(65) Prior Publication Data

US 2004/0235519 A1    Nov. 25, 2004

(51) Int. Cl.
*H04M 1/00* (2006.01)

(52) U.S. Cl. .................... 455/557; 455/41.2; 455/41.3; 361/683

(58) Field of Classification Search ................ 455/557, 455/41.2, 41.3, 20–22, 41.1; 361/683; 375/322
See application file for complete search history.

(56) References Cited

U.S. PATENT DOCUMENTS

| | | | |
|---|---|---|---|
| 6,366,622 B1* | 4/2002 | Brown et al. | 375/322 |
| 6,717,801 B1* | 4/2004 | Castell et al. | 361/683 |
| 6,801,755 B2* | 10/2004 | Kardach et al. | 455/41.2 |
| 2003/0003865 A1* | 1/2003 | Defosse et al. | 455/41 |

OTHER PUBLICATIONS

Analog Devices "Direct Conversion Quadrature Demodulator" 0.8 GHz-2.7 GHz; www.analog.com; Analog Devices, Inc. 2001 (1 pg.).
Analog Devices "Preliminary Technical Data" 800 MHz-2.7 GHz Quadrature Modulator; www.analog.com; Analog Devices, Inc. 2003.

* cited by examiner

*Primary Examiner*—Joseph Feild
*Assistant Examiner*—Phuoc H. Doan

(57) ABSTRACT

The present invention provides a wireless communication module system for use with a portable personal computer (PC) having a motherboard and an integral display screen. In one embodiment, the system includes a single wired interface having first and second ends, where the first end is coupled to the motherboard and the second end is coupled to the display screen and provides a connection port. The system further includes a wireless communication module having an antenna and an interface port removably coupled to the connection port. In this embodiment, the module also includes a transceiver configured to employ the antenna to transmit and receive radio communication signals, where the transceiver is further configured to employ the interface port to communicate with the motherboard. A method for performing a wireless communication and a wireless communication system incorporating the wireless communication module system or the method are also disclosed.

51 Claims, 6 Drawing Sheets

WIRELESS COMMUNICATION MODULE SYSTEM AND METHOD FOR PERFORMING A WIRELESS COMMUNICATION

TECHNICAL FIELD OF THE INVENTION

The present invention is directed, in general, to wireless communication and, more specifically, to a wireless communication module system, a method for performing a wireless communication and a wireless communication system incorporating the wireless communication module system or the method.

BACKGROUND OF THE INVENTION

The benefits of wireless communications have steadily increased over the years, especially as technology has provided a large growth in portable computing power. Specifically, notebook computers, or "laptops," have become prevalent in today's fast-paced society. Although overall costs associated with computer manufacturing have reduced in recent years, the complexity of conventionally available wireless communication devices for use with portable computers has typically left associated expenses relatively high.

One of the more common techniques typically used for wireless communication with notebook computers is connecting a wireless Local Area Network (LAN) device to a card slot in the notebook computer. This approach typically calls for the card to follow the Personal Computer Memory Card International Association (PCMCIA) standard used in notebook computer slots, which, unfortunately, requires one of the few available slots to be continuously occupied in order for wireless communication to take place. In addition, the complexity of the electrical interconnections required for PCMCIA interfaces or similar type interfaces typically drives up manufacturing costs, as well as the complexity of the interface between the PCMCIA connections of the computer and the wireless communication device. In addition, the close proximity of conventional PCMCIA card slots to the motherboard of the PC typically results in some radio frequency (RF) signal interference between the components located on the motherboard and the PCMCIA device.

Another approach to portable wireless communication is the implementation of wireless communication equipment into the casing of portable computers, along with the usual computing circuitry. In fact, many computer manufacturers offer "wireless ready" portable computers with antenna circuitry for transmitting and receiving radio communication signals already built-in to the computer. With this approach, the antenna circuitry is hard-wired into the computer's circuitry and is employed when a transceiver is installed, either externally or embedded with the computer's circuitry.

Unfortunately, high costs-associated with this approach may often deter consumers from purchasing such systems. For example, the manufacturing costs associated with hard-wiring an antenna and transceiver circuitry into a portable computer is typically quite high. In addition, such circuitry is typically complex and must be shielded from the computer's processor to prevent potential signal interference, both of which can further increase costs. Moreover, government communications agencies in most countries require certification of such radio devices. As such, once the antenna and/or the transceiver circuitry are installed in a portable computer, these agencies often require that the entire computer now be certified. As a result, each type of portable computer or desktop computer that is "wireless ready" typically has to go through the hassle and associated expense of being certified, thus increasing the cost and time to market.

Accordingly, what is needed in the art is a wireless communications device for use with a portable computer that does not suffer from the deficiencies found in the prior art.

SUMMARY OF THE INVENTION

To address the above-discussed deficiencies of the prior art, the present invention provides a wireless communication module system for use with a portable personal computer (PC) having a motherboard and an integral display screen. In one embodiment, the system includes a single wired interface having first and second ends, where the first end is coupled to the motherboard and the second end is coupled to the display screen and provides a connection port. The system further includes a wireless communication module having: (1) an antenna, (2) an interface port removably coupled to the connection port, and (3) a transceiver configured to employ the antenna to transmit and receive radio communication signals. The transceiver is further configured to employ the interface port to communicate with the motherboard. For purposes of the present invention, the phrase "configured to" means that the device, the system or the subsystem includes the necessary software, hardware, firmware or a combination thereof to accomplish the stated task.

In another aspect, the present invention provides a method for performing a wireless communication for use with a portable personal computer having a motherboard and an integral display screen. In one embodiment, the method includes employing a single wired interface having first and second ends to receive and transmit digital data with the motherboard. The first end of the single wired interface is coupled to the motherboard, and the second end of the single wired interface is coupled to the display screen and providing a connection port. The method further includes performing wireless communication with a wireless communication module. The wireless communication module includes an antenna, and an interface port removably coupled to the connection port. The wireless communication module further includes a transceiver configured to employ the antenna to transmit and receive radio communication signals, and the transceiver is further configured to employ the interface port to communicate with the motherboard.

In yet another aspect, the present invention provides a wireless communication system for use in a digital network. In one embodiment, the system includes a wireless interface that is configured to provide an interface to the digital network. The system also includes at least one wireless portable personal computer (PC) that is interfaced with the digital network via the wireless interface. The at least one wireless portable PC having: (1) a motherboard and an integral display screen, (2) a single wired interface having first and second ends, where the first end is coupled to the motherboard and the second end is coupled to the display screen providing a connection port, and (3) a wireless communication module having an antenna and an interface port removably coupled to the connection port. In this embodiment, the wireless communication module further includes a transceiver that is configured to employ the antenna to transmit and receive radio communication signals. The transceiver is also configured to employ the interface port to communicate with the motherboard.

The present invention also provides, in one embodiment, a wireless communication module system for use with a computing device having an encasing and a motherboard therein. The wireless communication module system includes a singled wired interface having first and second ends, where the first end is coupled to the motherboard and the second end is coupled to a connection port located on the encasing at a position distal from the motherboard. The wireless communication module system further includes a wireless communication module having an antenna, an interface port removably coupled to the connection port and a transceiver. The transceiver is configured to employ the antenna to transmit and receive radio communication signals, and employ the interface port to communicate with the motherboard. In addition, the wireless communication module is adapted to be positioned distal to the motherboard so that interference is reduced.

In another embodiment, the present invention provides a wireless communication module system for use with a computing device having an encasing and a motherboard therein. The wireless communication module system includes: (1) a wireless module interface coupled to the motherboard and configured to receive and transmit raw digital data with the motherboard, the wireless module interface is further configured to convert between the raw digital data and intermediate data for wireless network communication, (2) a wired interface having first and second ends, the first end is coupled to the wireless module interface and the second end is coupled to a connection port located on the encasing at a position distal from the motherboard, and (3) a wireless communication module. The wireless communication module, in this embodiment, includes an antenna and an interface port removably coupled to the connection port. The wireless communication module further includes a radio module that is configured to employ the antenna to transmit and receive radio communication signals. The radio module is further configured to employ the interface port to communicate with the wireless module interface and to convert between the radio communication signals and the intermediate data. Also, the radio module is adapted to be positioned distal to the motherboard so that interference is reduced.

In yet another embodiment, the present invention provides a method of performing wireless communication for use with a computing device having an encasing and a motherboard therein. The method includes receiving and transmitting raw digital data between the motherboard and a wireless module interface coupled to the motherboard, and converting between the raw digital data and intermediate data for wireless network communication. The method also includes employing a wired interface having first and second ends, where the first end is coupled to the wireless module interface and the second end is coupled to a connection port located on the encasing at a position distal from the motherboard, this employing also including employing the wired interface to communicate the intermediate data between the wireless module interface and the connection port. The method further includes employing a wireless communication module to communicate to a wireless network. The wireless communication module having: (1) an antenna, (2) an interface port removably coupled to the connection port, and (3) a radio module configured to employ the antenna to transmit and receive radio communication signals. The radio module is further configured to employ the interface port to communicate with the wireless module interface and to convert between the radio communication signals and the intermediate data. Also, the radio module is adapted to be positioned distal to the motherboard so that interference is reduced.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the present invention.

BRIEF DESCRIPTION OF THE DRAWINGS

For a more complete understanding of the present invention, reference is now made to the following detailed description taken in conjunction with the accompanying FIGUREs. It is emphasized that various features may not be drawn to scale. In fact, the dimensions of various features may be arbitrarily increased or reduced for clarity of discussion. In addition, it is emphasized that some circuit components may not be illustrated for clarity of discussion. Reference is now made to the following descriptions taken in conjunction with the accompanying drawings, in which.

DETAILED DESCRIPTION

Figure 1:
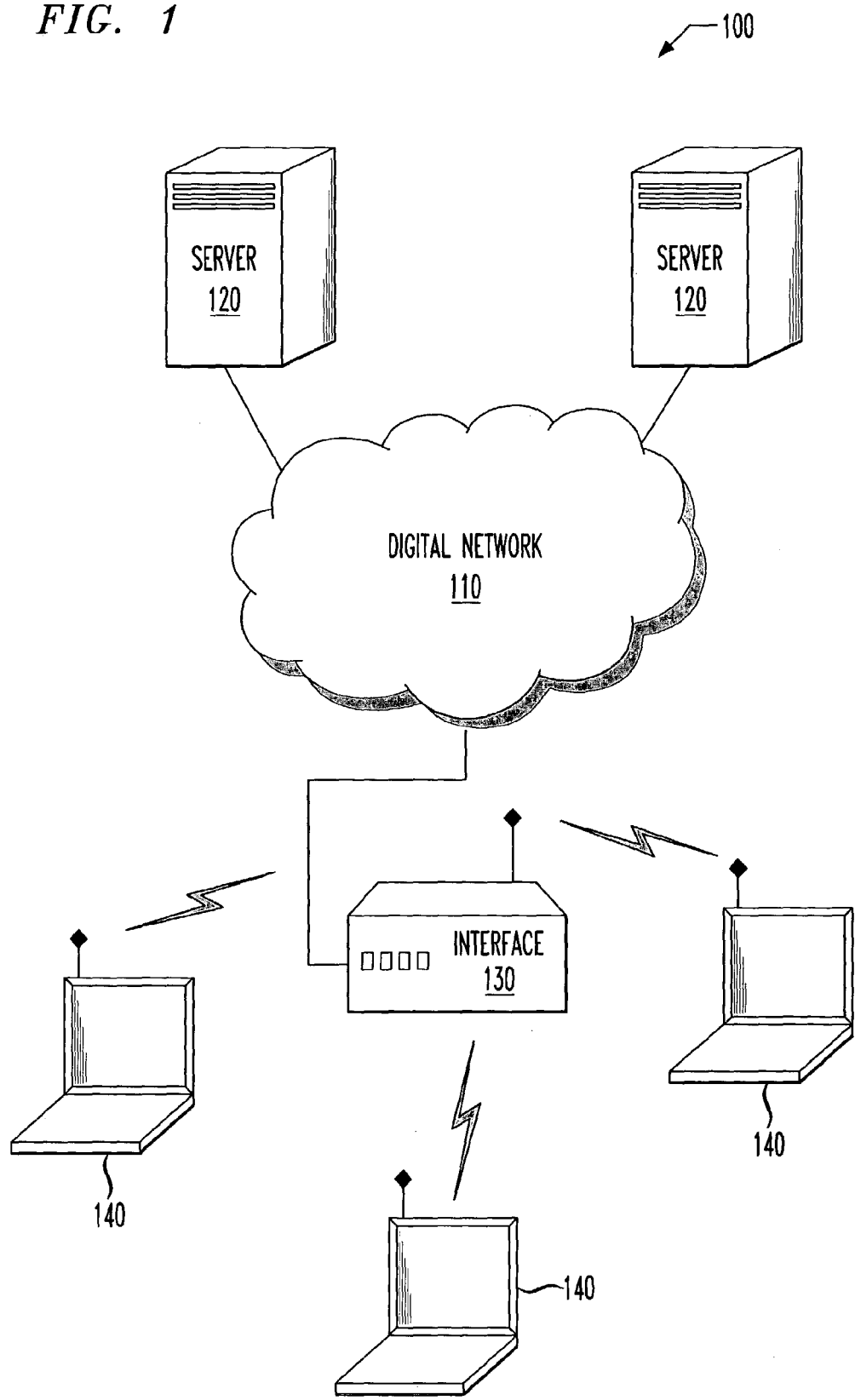
FIG. 1 illustrates a wireless communication system that provides an environment for wireless portable personal computers incorporating a wireless communication module system constructed according to the principles of the present invention.

Referring initially to FIG. 1, illustrated is a wireless communication system 100 that provides an environment for wireless portable personal computers incorporating a wireless communication module system constructed according to the principles of the present invention. The system 100 includes a digital network 110, which may be a Local Area Network (LAN), the Internet, or any other computer network capable of receiving and routing digital communications.

The wireless communication system 100 further includes servers 120. The servers 120 may be conventional network servers that are coupled to the digital network 110 and provide storage for information transmitted to or from the digital network 110. Although only two servers 120 are illustrated, those skilled in the art understand the system 100 may include any number of servers 120. The system 100 also includes a wireless interface 130. The wireless interface 130 is coupled to the digital network 110, as well as to a plurality of wireless portable PCs 140. The portable PCs 140 each include a wireless communication module system (not separately illustrated) for wireless communication with the wireless interface 130. See FIG. 2 for a more detailed discussion of a wireless communication module system.

In accordance with conventional practice, the wireless interface 130 receives radio communication signals from the portable PCs 140 and converts those signals for communication with the digital network 110. In addition, the wireless interface 130 converts signals from the digital network 110 to radio communication signals for transmission to the portable PCs 140. As used herein, the phrase "radio communication signals" means wireless signals within the electromagnetic spectrum employable for transmitting voice, data or other information. Examples of radio communication signals include, but are not limited to, radio frequency (RF) signals or cellular communication signals.

Figure 2:
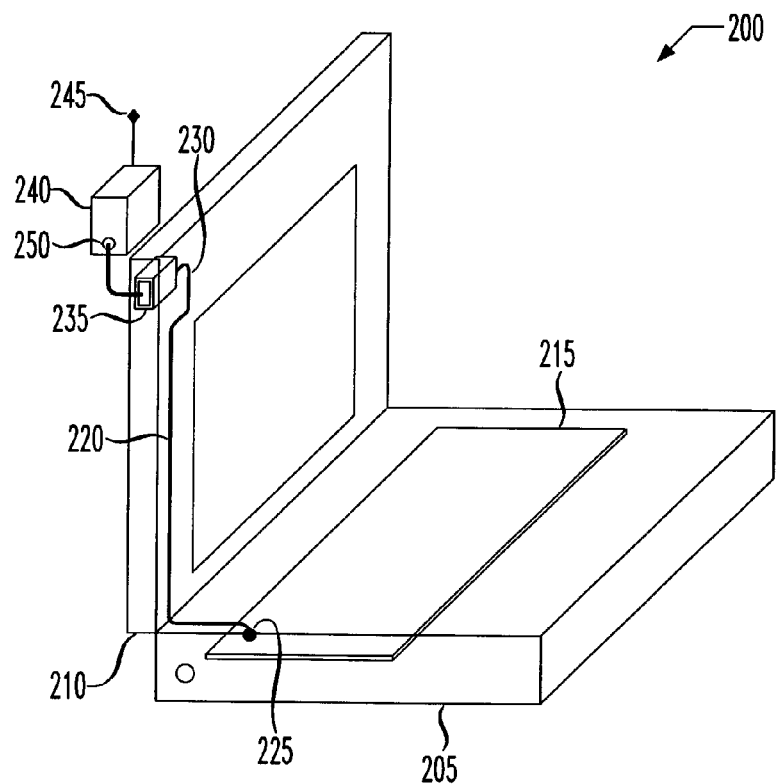
FIG. 2 illustrates an isometric, semi-transparent view of one embodiment of a wireless communication module system constructed according to the principles of the present invention.

Looking now at FIG. 2, illustrated is an isometric, semitransparent view of one embodiment of a wireless communication module system, generally designated 200, constructed according to the principles of the present invention. The system 200 includes a portable personal computer (PC), such as the portable PCs 140 illustrated in FIG. 1, having a base 205 and an integral display screen 210. Advantageously, the portable PC may be, for example, a notebook computer or laptop, however the present invention is not so limited. In the illustrated embodiment, the display screen 210 is hinged with the base 205 of the PC such that the display screen 210 may be closed to allow easier portability of the PC. Of course, other methods for attaching the display screen 210 to the base 205 may also be employed.

As illustrated, the system 200 includes a motherboard 215 mounted within the base 205 of the PC. In accordance with conventional practice, the motherboard 215 may be a printed circuit board (PCB) having several conventional computing components of the PC mounted and interconnected thereon. Also, included in the system 200 is a single wired interface 220. In one embodiment, the single wired interface 220 may include multiple conductors therein. In a more specific embodiment, a portion of the multiple conductors supplies power from the motherboard 215 to the system 200. In addition, the single wired interface 220 includes a first end 225 and a second end 230. The first end 225 is coupled to the motherboard 215 via interface circuitry to communicate with the motherboard to provide serial communication to the single wired interface 220. In advantageous embodiments, the interface circuitry may include, for example, a universal serial bus (USB), a universal serial bus 2 (USB2), a FireWire or FireWire 2 interface, an SDI/O, or an optical port. The second end 230 of the single wired interface 220 is coupled to the display screen 210 at a connection port 235 positioned therein.

The system 200 further includes a wireless communication module 240 for transmitting and receiving radio communication signals. In one embodiment, the module 240 is a network interface card (NIC), however the present invention is not so limited. In other embodiments, the module 240 may be a wireless Local Area Network (LAN) communications module, a cellular communications module, or a satellite communications module. In any case, by providing the module 240 the system 200 may be employed to establish wireless communication with digital networks such as an LAN or the Internet.

In an exemplary embodiment, the wireless communication module 240 includes an antenna 245, which is employed by a transceiver (not illustrated) within the module 240 to transmit and receive the radio communication signals. Although the antenna 245 is illustrated as a telescopic antenna, an internal antenna, embedded with the transceiver, may also be employed. The module 240 further includes an interface port 250. The interface port 250 may be removably coupled to the connection port 235 using a conventional cable, or, alternatively, may simply be directly connected.

By coupling the interface port 250 to the connection port 235, the transceiver may employ the interface port 250 to communicate with the motherboard 215. The module 240 may also receive instructions regarding the specifics of a wireless communication from the motherboard 215 via the single wired interface 220. Additionally, the transceiver may receive power via the single wired interface 220.

In one embodiment of the present invention, the connection port 235 is a standard serial port of the type commonly available and in regular use. For example, embodiments of the connection port 235 may include a universal serial bus (UBS), a universal serial bus 2 (USB2), or a FireWire or FireWire 2 interface, a SD Memory Card (SDI/O), or an optical port. By constructing the connection port 235 as a serial port, the wireless communication module 240 may quickly and easily facilitate the desired wireless communication, while using a low-cost interface with the PC.

Advantageously, the connection port 235, and thus the module 240, is located in a position distal from the motherboard 215. Those who are skilled in the pertinent art understand that during operation of the PC, the electrical components mounted on the motherboard 215 will generate a substantial amount of electrical and magnetic fields that can typically interfere with radio communication signal transmission and reception. As a result, the "distal position" of the connection port 235 is defined herein as a distance from the motherboard 215 or other potentially interfering components of the system 200 sufficient to prevent or substantially reduce the amount subjecting the wireless communication module 240 to radio communication signal interference from these potentially interfering devices. By positioning the connection port 235 and the module 240 at such a distance, wireless communication with the system 200 may be accomplished in a more efficient manner. In the illustrated embodiment, an optimal location for the wireless communication module 240 would be proximate the top of the display screen 210.

In a related embodiment, the system 200 is constructed according to the principles discussed herein such that only the wireless communication module 240 would require certification for RF communications by government communications agencies around the world. More specifically, most countries require certification of devices that transmit radio signals, for example, the Federal Communications Commission (FCC) in the United States. As described previously, conventional portable computers that are manufactured as "wireless ready" typically require the entire computer to be certified by such agencies.

However, with the wireless communication module system 200 of the present invention, a portable computer may be pre-wired with the single wired interface 220 by the computer manufacturer. Then, the wireless communication module 240 may be subsequently purchased and either temporarily attached or permanently embedded into the computer. However, since the wireless communication module 240 is the only device generating radio communication signals, the wireless communication module 240 may be certified at the time of manufacture and not at the time of installation. As a result, certification inconvenience and expense are eliminated for the end user or integrator of the system 200.

Figure 3:
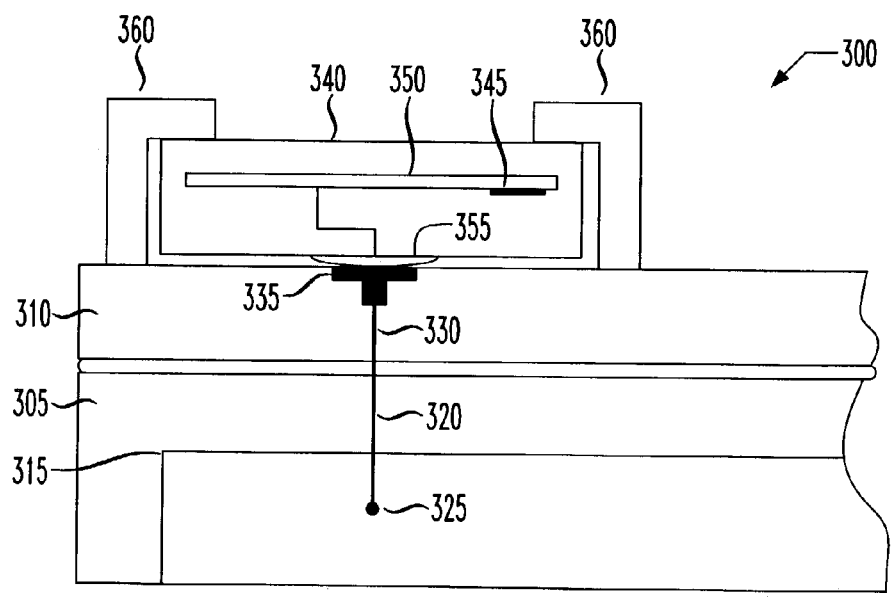
FIG. 3 illustrates a close-up, overhead view of another embodiment of a wireless communication module system constructed according to the principles of the present invention.

Turning now to FIG. 3, illustrated is a close-up, overhead view of another embodiment of a wireless communication module system, generally designated 300, constructed according to the principles of the present invention. Only a corner of the system 300 is illustrated so as to focus on the specifics of this embodiment of the invention.

As with the system 200 of FIG. 2, the system 300 in FIG. 3 includes a portable PC having a base 305 and an integrated display screen 310. Located within the base 305 is a motherboard 315 for use in processing information and instructions in the portable PC. Also included is a single wired interface 320 having first and second ends 325, 330. The first end 325 is coupled to the motherboard 315 and the second end 330 is coupled to the display screen 310 at a connection port 235.

Further included in the system 300 in FIG. 3 is a wireless communication module 340. In the illustrated embodiment, the module 340 includes an embedded antenna 345 formed on a circuit board of a transceiver 350 and manufactured to provide a sleeker profile to the module 340. As before, the transceiver 350 is coupled to an interface port 355 and is employed to transmit and receive radio communication signals to facilitate wireless communication for the portable PC.

Advantageously, the embodiment illustrated in FIG. 3 includes an integrated receptacle 360 formed on the display screen 310. More specifically, in this embodiment, the module 340 may be positioned into the integrated receptacle 360 prior to commencing wireless communication by simply sliding the module 340 between the grasping arms of the receptacle 360 until it comes to rest on a base of the receptacle 360. In addition, a slight press fit into the integrated receptacle 360 would prevent the module 340 from coming loose during use or transport of the portable PC. As the module 340 is positioned in the receptacle 360, the interface port 355 comes in electrical contact with the connection port 335, such that information or control signals may be passed between the motherboard 315 and the module 340 via the single wired interface 320. Although placed in an integrated receptacle 360 of the display screen 210, preferably the module 340 is again the only device generating radio communication signals. As a result, only the module 340 need be certified by government communications agencies, such as the FCC.

In another embodiment of the present invention, the integrated receptacle 360 may be embedded entirely within the display screen 310. More specifically, the display screen 310 may be equipped with a slot or other type of opening on an upper edge of the display screen 310, distal from the interference introduced by the motherboard 315. In an alternative embodiment, the receptacle 360 may be within a door at a distal end of the display screen 310 that may be opened so that the module 340 may be inserted and connected to the connection port 335. In either embodiment, the module 340 may simply be inserted into the embedded receptacle 360, making an electrical connection with the connection port 335 inside the display screen. Of course, in accordance with the principles of the present invention, the module 340 would still be removable from such an embedded receptacle 360 so to prevent the entire portable computer from having to be certified by government agencies.

By providing a wireless communication module system that employs a single wired interface in the integrated display screen of a computer for connection with a wireless communication module, the present invention provides a simple and inexpensive means for wireless communication with a portable PC. In addition, because only the module, which either is removable from or embedded into the display screen, generates radio communication signals, government agency communications certification need only be obtained for the wireless communication module, and typically obtained at the time of manufacture of the wireless communication module. Those who are skilled in the art will understand that such an approach eliminates the inconvenience and expense of certifying the entire computer, either at the time of manufacture or at the time upgrade. Moreover, by providing a single wired interface, for example, a USB, a FireWire, an SDI/O, or an optical connector, which may be manufactured with the computer or imbedded therein at a later time, the present invention provides a simple and inexpensive means for wireless communication with a portable PC. Furthermore, unlike conventional ports such as PCMCIA card slots, the present invention provides a connection port for the single wired interface a sufficient distance from any interference-causing components of the PC to prevent interference with the wireless communication. Still further, a wireless communication module system according to the present invention may be employed with most existing and conventionally designed portable PCs, while retaining benefits such as those described above.

Figure 4:
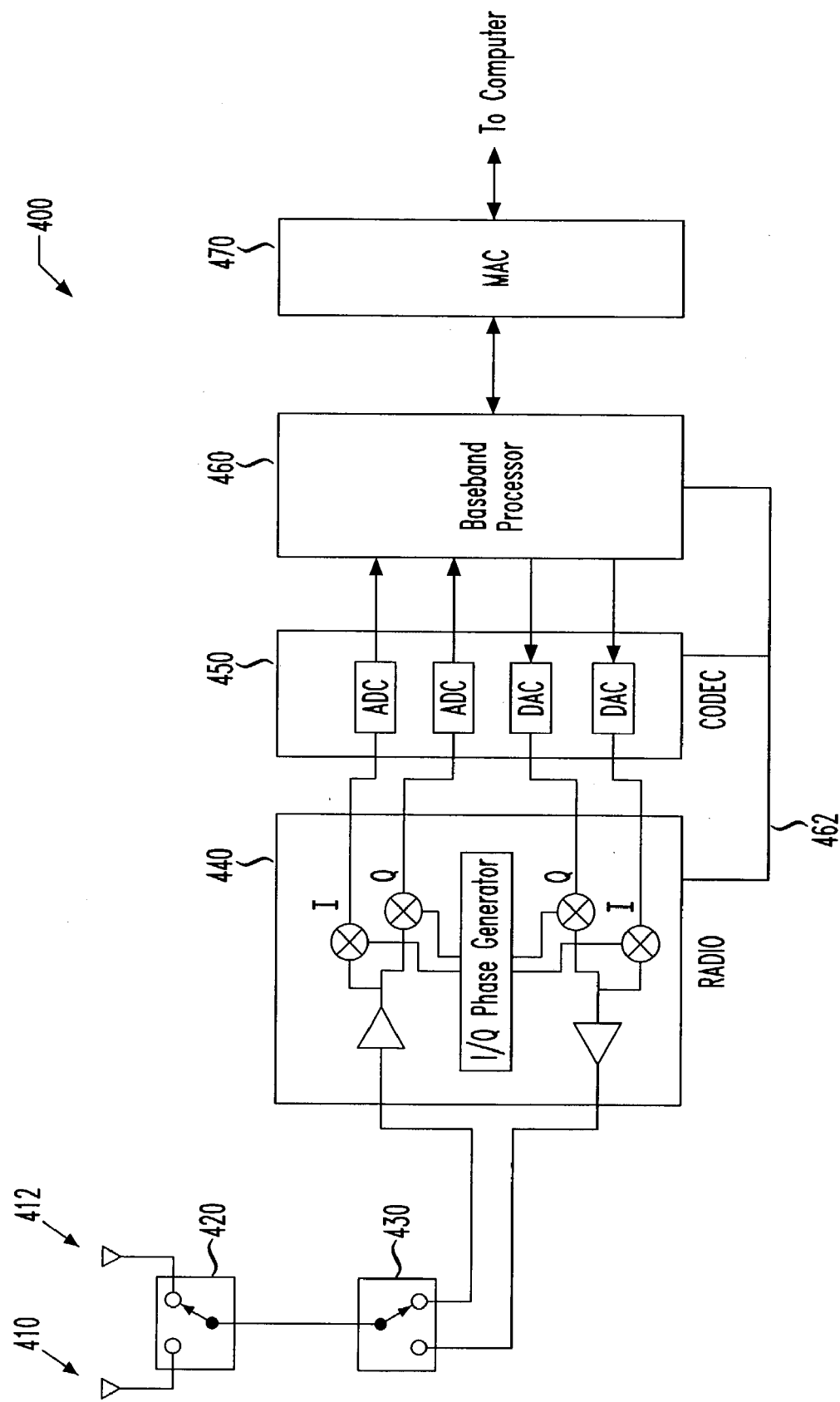
FIG. 4 illustrates a block diagram of an embodiment of a wireless communication module constructed according to the principles of the present invention.

Turning now to FIG. 4, illustrated is a block diagram of an embodiment of a wireless communication module, generally designated 400, constructed according to the principles of the present invention. The wireless communication module 400 may be a wireless Local Area Network (LAN) communication module. In another embodiment, the wireless communication module 400 may be a cellular communication module. In yet another embodiment, the wireless communication module 400 may be a satellite communication module. In the illustrated embodiment, the wireless communication module 400 includes conventional transmit and receive antennas 410, 412 coupled to a conventional antenna switch 420. The antenna switch 420 is also coupled to a transmit/receive switch 430. The transmit/receive switch 430 is coupled to a radio frequency modulator/demodulator 440. More specifically, the transmit/receive switch 430 works in conjunction with the antenna switch 420 to switch the receive antenna 412 to the receive portion of the radio frequency modulator/demodulator 440 and to switch the transmit antenna 410 to the transmit portion of the radio frequency modulator/demodulator 440. In another embodiment, the transmit and receive antennas 410, 412, antenna switch 420 and transmit/receive switch 430 may be embodied in a conventional single antenna system capable of transmission and reception. In addition, the radio frequency modulator/demodulator 440 may be a conventional radio frequency modulator/demodulator or may be a specialized modulator/demodulator for a specific transmission type. The circuits and interconnections illustrated within the radio frequency modulator/demodulator 440 are for illustrative purposes only and the radio frequency modulator/demodulator 440 is not limited to these specific circuits and interconnections.

The radio frequency modulator/demodulator 440 is coupled to a coder/decoder (Codec) 450, which is coupled to a conventional baseband processor 460. The baseband processor 460 may control and/or monitor the radio frequency modulator/demodulator 440 and the Codec 450 via a control line 462. The baseband processor 460 is also coupled to a media access controller 470, which communicates with a computer system (not shown). In one embodiment, the media access controller 470 communicates with the computer system via a single wired interface, such as the single wired interface 220 of FIG. 2. The computer system may be a motherboard of a portable personal computer. In another embodiment, the computer system may be a personal data assistant, (PDA). In yet another embodiment, the computer system may be household appliance.

When the wireless communication module 400 is receiving wireless information, the antenna switch 420 and the transmit/receive switch 430 are switched in such a manner so that the receive antenna 412 is coupled to the receive portion of the radio frequency modulator/demodulator 440. The receive portion of the radio frequency modulator/demodulator 440 converts (or demodulates) radio communication signals from the receive antenna 412 into data suitable for the Codec 450. The conversion usually includes selecting the appropriate radio frequency (RF) channel, bandpass filtering and amplification/attenuation. In the illustrated embodiment, the receive portion of the radio frequency modulator/demodulator 440 also converts the radio communication signals into In-Phase and Quadrature phase components, which are then passed to the Codec 450. The Codec 450 then translates the analog signals received from the radio frequency modulator/demodulator 440 into digital signals that can be processed by the baseband processor 460. In the illustrated embodiment, the Codec 450 employs analog-to-digital converters (ADCs) to translate the analog signals to digital signals.

The baseband processor 460 receives the translated digital signals from the Codec 450 and converts them into digital data by means of amplitude/phase demodulation, error decoding, frequency conversion/shifting and by decoding the resulting digital signals. The media access controller 470 then converts the received digital data into raw digital data by applying the appropriate actions dependent upon protocol states of the computer system (host) and the baseband processor 470. At the appropriate time, which is protocol dependent, the raw digital data is sent to the computer system for further processing, such as the motherboard 215 of FIG. 2.

When the wireless communication module 400 is transmitting wireless information, the media access controller 470 receives raw digital data from the computer and converts the raw digital data into digital data by applying the appropriate actions dependent upon the protocol states of the computer system and the baseband processor 460. The media access controller 470 sends the converted digital data to the baseband processor 460. The baseband processor 460 converts the digital data into a real-time digital equivalent of the required radio input and passes the converted data as digital signals to the Codec 450. This conversion usually includes employing signal processing to put the digital data into the appropriate format as required for the application (e.g., 802.11a using a multi-sub carrier signal composition), which may include some form of error coding, frequency conversion/shifting, and/or phase and amplitude modulation by means of a quadrature modulator. In the illustrated embodiment, the baseband processor 460 sends In-Phase and Quadrature phase components of digital signals to the Codec 450.

The Codec 450 translates the digital signals received from the baseband processor 460 into an appropriate analog format for the radio frequency modulator/demodulator 440. In the illustrated embodiment, the Codec 450 employs digital-to-analog converters (DACs) to convert the In-Phase and Quadrature phase digital signals to In-Phase and Quadrature phase analog signals. The transmit portion of the radio frequency modulator/demodulator 440, by means of signal filtering, signal amplification and modulation, converts the analog signals into the appropriate signaling format onto the selected RF carrier (radio communication signals). The transmit/receive switch 430 and the antenna switch 420 are switched in such a manner so that the transmit antenna 410 is coupled to the transmit portion of the radio frequency modulator/demodulator 440, and the radio communication signals are transmitted via the transmit antenna 410. In addition, one skilled in the art should know that the wireless communication module 400 is not limited to the elements or components described above. Other embodiments of the present invention may include other or different components depending upon the type of transmission and reception requirements and the type of protocol employed.

Figure 5:
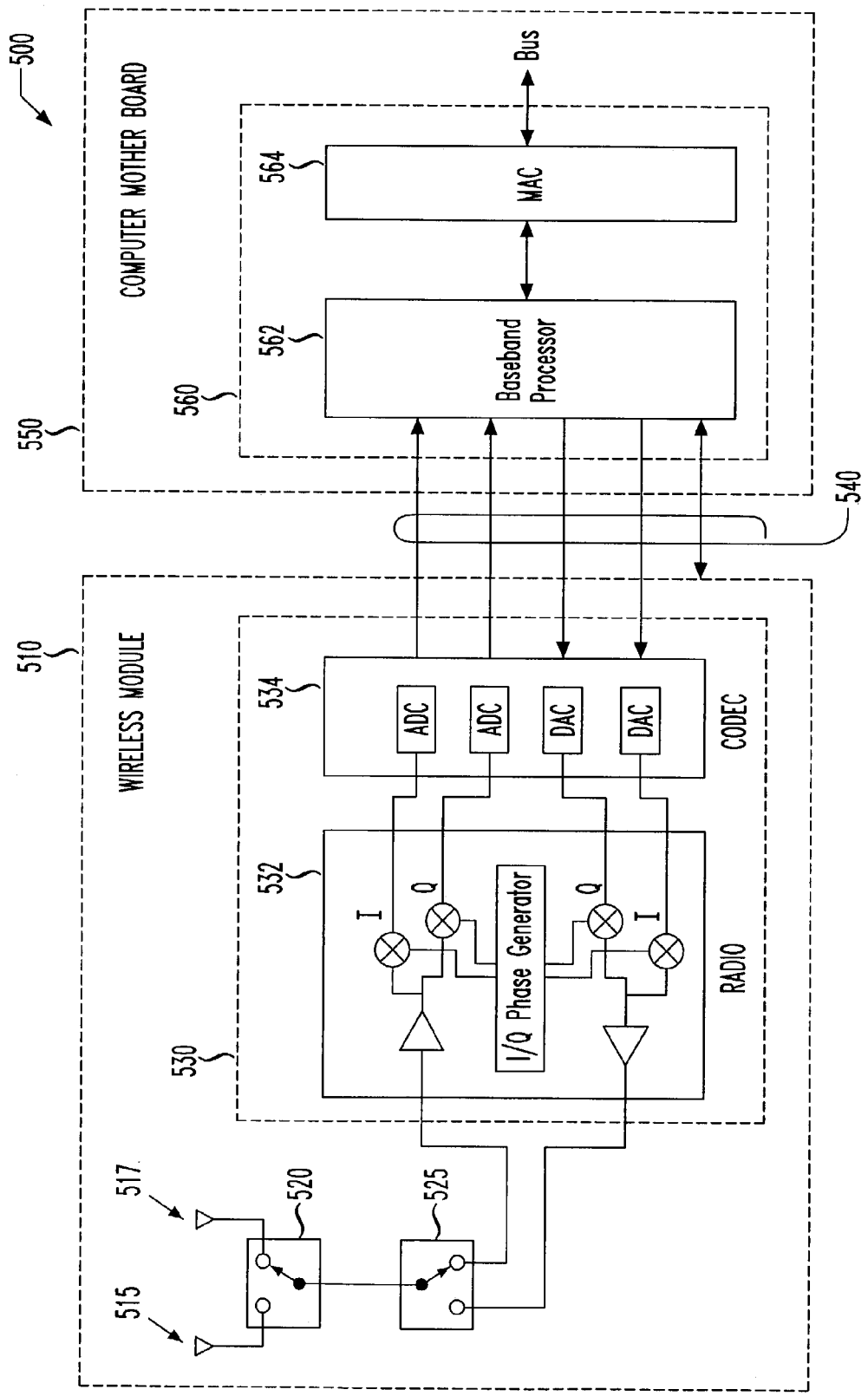
FIG. 5 illustrates a block diagram of an alternative embodiment of a wireless communication module system constructed according to the principles of the present invention.

Turning now to FIG. 5, illustrated is a block diagram of an alternative embodiment of a wireless communication module system, generally designated 500, constructed according to the principles of the present invention. In this alternative embodiment, the wireless communication module system 500 includes a wireless communication module 510 positioned distal from a motherboard 550 of a computing device. The wireless communication module 510 includes transmit and receive antennas 515, 517 coupled to an antenna switch 520. The antenna switch 520 is also coupled to a transmit/receive switch 525. The transmit/receive switch 525 is coupled to a radio module 530. The transmit and receive antennas 515, 517, the antenna switch 520 and the transmit/receive switch 525 may be similar to and operate the same as the transmit and receive antennas 410, 412, the antenna switch 420 and the transmit/receive switch 430 of FIG. 4. In a related embodiment, the wireless communication module 510 may employ a conventional single antenna system capable of transmission and reception.

The transmit/receive switch 525 works in conjunction with the antenna switch 520 to switch the receive antenna 517 to the receive portion of the radio module 530 and to switch the transmit antenna 515 to the transmit portion of the radio module 530 in order to receive and transmit radio communication signals. The radio module 530 is also configured to convert between radio communication signal and intermediate data. In one embodiment, the intermediate data are the radio communication signals (analog information) that have been converted and translated into digital signals. The radio module 530 also transmits and receives the intermediate data over a wired interface 540 coupled to a wireless module interface 560, which is coupled to the computer motherboard 550. More specifically, the radio module 530 communicates through an interface port (not shown) that is removably coupled to a connection port (not shown) of the wired interface 540. See FIGS. 2 and 3 for descriptions of an exemplary interface port and an exemplary connection port. In the illustrated embodiment, radio module 530 includes a radio frequency modulator/demodulator 532 and a Codec 534. The radio frequency modulator/ demodulator 532 and the Codec 534 are similar to and have the same functionality as the radio frequency modulator/demodulator 400 and the Codec 450 of FIG. 4, respectively. In one embodiment, the Codec 534 transmits and receives intermediate data (e.g., digital signals) to/from the wireless module interface 560 via the wired interface 540.

The wireless module interface 560 is configured to receive and transmit raw digital data with the computer motherboard 550. In one embodiment, the raw digital data may be data that is typically sent over a network but has not been formatted according to a particular transmission or network protocol. The wireless module interface 560 is further configured to convert between raw digital data and intermediate data for wireless network communication. In the illustrated embodiment, the wireless module interface 560 includes a baseband processor 562 and a media access controller 564. The baseband processor 562 receives and transmits intermediate data from/to the radio module 530 via the wired interface 540. The media access controller 564 is coupled to the baseband processor 562 and transmits and receives raw data to/from the computer motherboard 550. The baseband processor 562 and the media access controller 564 are similar to and have the same functionality as the baseband processor 460 and the media access controller 470 of FIG. 4, respectively.

The present invention, in one embodiment, advantageously employs digital signals between the motherboard 550 and the wireless communication module 510 in order to reduce the susceptibility of interference of the wireless communication module system 500. Moreover, positioning the portion of the wireless communication module system that is responsible for decoding wireless information (the radio frequency modulator/demodulator 532 and the codec 534) at a position distal from the motherboard 550, reduces the susceptibility of interference of the wireless communication module 510 and increases its ability to decode and encode wireless information.

Figure 6:
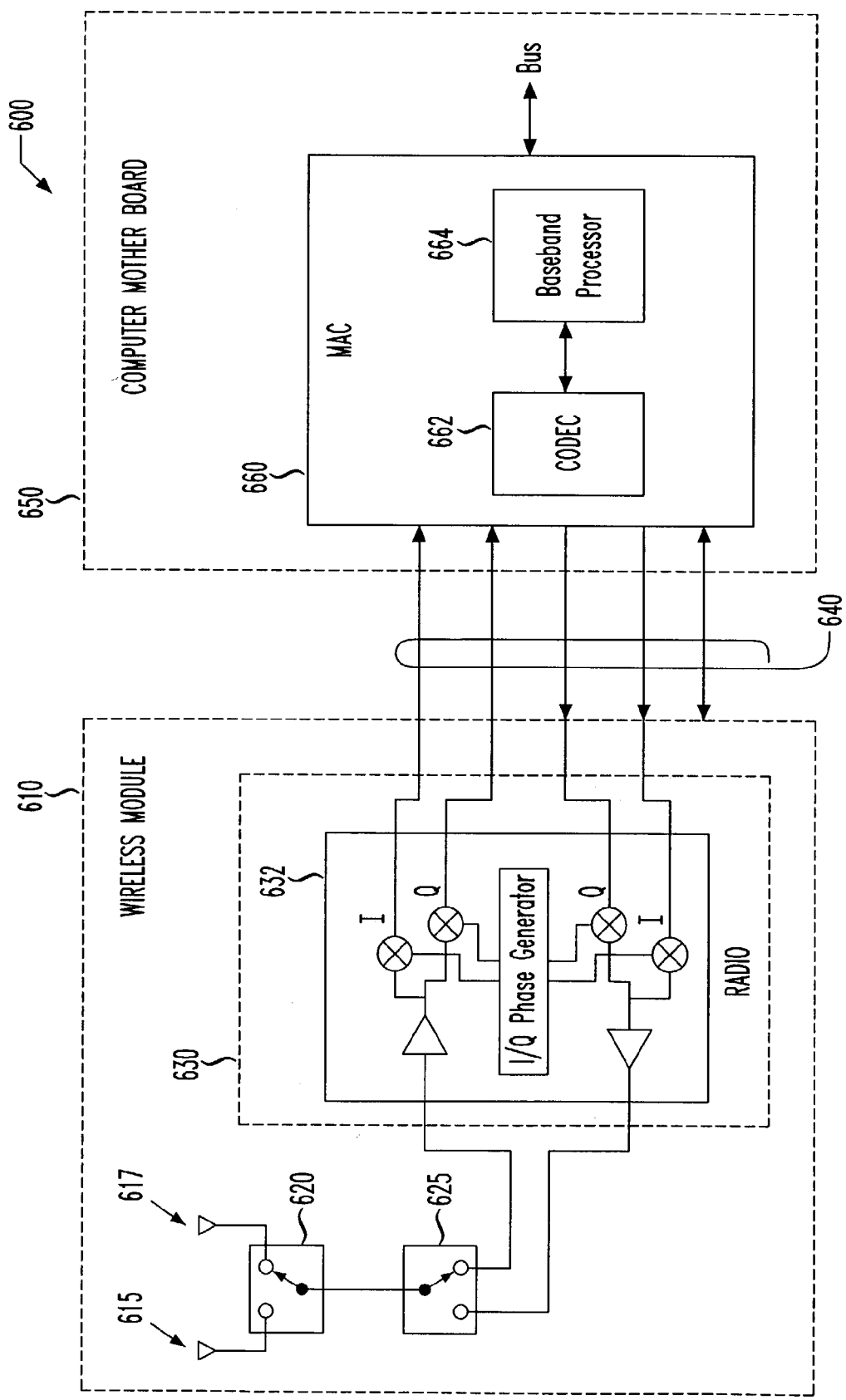
FIG. 6 illustrates a block diagram of another alternative embodiment of a wireless communication module system constructed according to the principles of the present invention.

Turning now to FIG. 6, illustrated is a block diagram of another alternative embodiment of a wireless communication module system, generally designated 600, constructed according to the principles of the present invention. In this alternative embodiment, the wireless communication module system 600 includes a wireless communication module 610 positioned distal from a motherboard 650 of a computing device. The wireless communication module 610 includes transmit and receive antennas 615, 617 coupled to an antenna switch 620. The antenna switch 620 is also coupled to a transmit/receive switch 625. The transmit/receive switch 625 is also coupled to a radio module 630. The transmit and receive antennas 615, 617, the antenna switch 620 and the transmit/receive switch 625 may be similar to and operate the same as the transmit and receive antennas 410, 412, the antenna switch 420 and the transmit/receive switch 430 of FIG. 4. In a related embodiment, the wireless communication module 610 may employ a conventional single antenna system capable of transmission and reception.

The transmit/receive switch 625 works in conjunction with the antenna switch 620 to switch the receive antenna 617 to the receive portion of the radio module 630 and to switch the transmit antenna 615 to the transmit portion of the radio module 630 in order to receive and transmit radio communication signals. The radio module 630 is also configured to convert between radio communication signal and intermediate data. In this embodiment, the intermediate data are the radio communication signals (analog information) that have been converted into data suitable for processing by a wireless module interface 660. The conversion may include selecting the appropriate radio frequency (RF) channel, bandpass filtering and amplification/attenuation. In another embodiment, the radio module 630 may convert the radio communication signals into In-Phase and Quadrature phase components and receive In-Phase and Quadrature phase signals from the wireless module interface 660.

The radio module 630 also transmits and receives the intermediate data over a wired interface 640 coupled to the wireless module interface 660, which is coupled to the computer motherboard 650. More specifically, the radio module 630 communicates through an interface port (not shown) that is removably coupled to a connection port (not shown) of the wired interface 640. See FIGS. 2 and 3 for descriptions of an exemplary interface port and an exemplary connection port. In the illustrated embodiment, radio module 630 includes a radio frequency modulator/demodulator 632 that is similar to and has the same functionality as the radio frequency modulator/demodulator 400 of FIG. 4.

The wireless module interface 660 is configured to receive and transmit raw digital data with the computer motherboard 650. In one embodiment, the raw digital data may be data that is typically sent over a network but has not been formatted according to a particular transmission or network protocol. The wireless module interface 660 is further configured to convert between raw digital data and intermediate data for wireless network communication. In the illustrated embodiment, the wireless module interface 660 may be a media access controller that includes a Codec 662 and a baseband processor 664. The Codec 662 and the baseband processor 664 are similar to and have the same functionality as the Codec 450 and baseband processor 460 of FIG. 4. In one embodiment, the media access controller 660 may have the same functionality as the media access controller 470 of FIG. 4, except the media access controller 660 includes additional functionality of controlling and interfacing with the internal Codec 662 and baseband processor 664.

The present invention, in the illustrated embodiment, advantageously employs a wireless communication module 610 that employs those components that encode and decode wireless information (the radio frequency modulator/demodulator 632) at a position distal from the motherboard 650. The remaining components for wireless communication are within a wireless module interface 660 couple to the computer motherboard 650. This configuration allows for reduced susceptibility of interference at the wireless communication module 610 to increase its ability to decode and encode wireless information, and increased communication processing at the computer motherboard 650.

Figure 7:
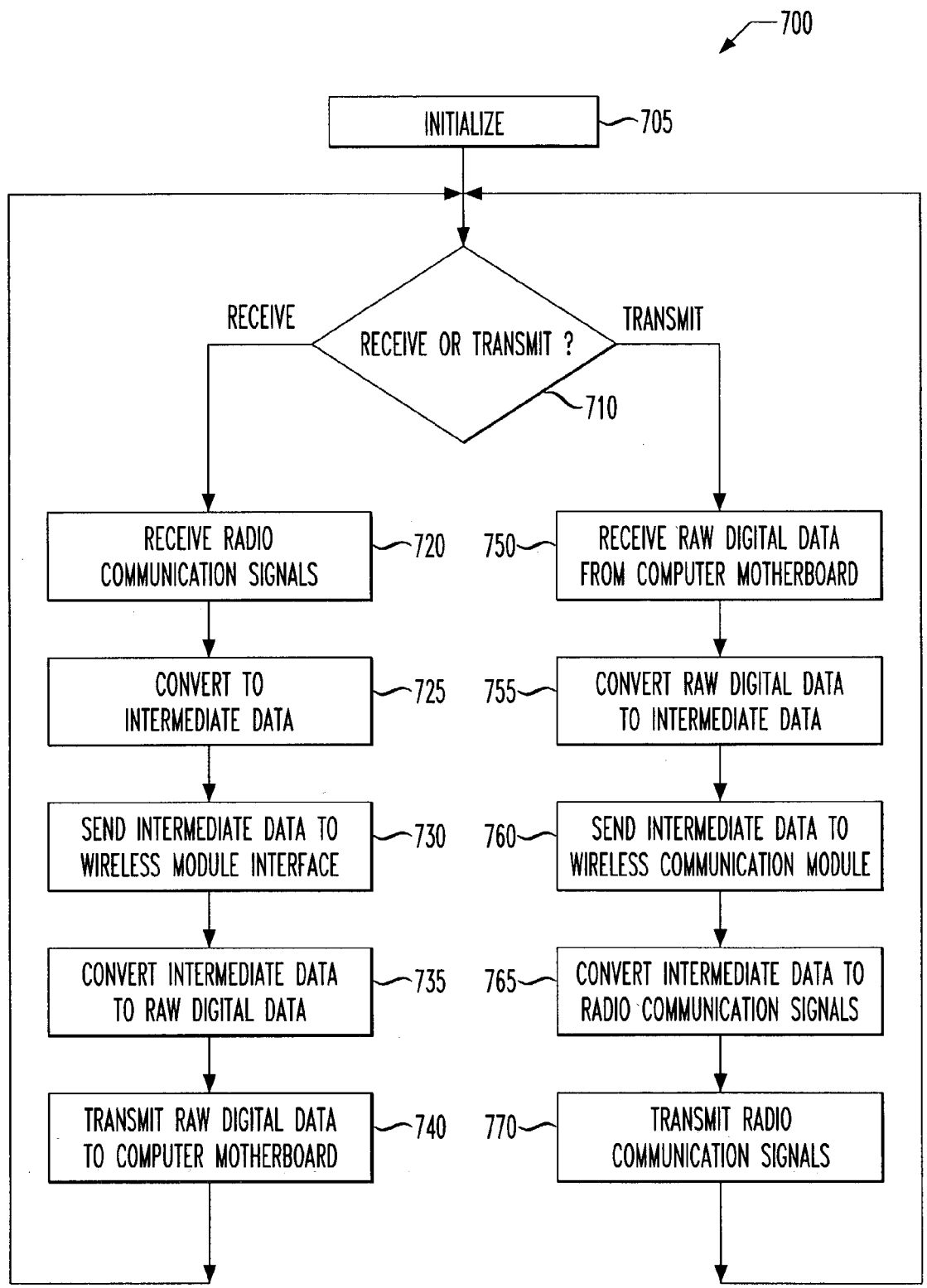
FIG. 7 illustrates an embodiment of a method of performing wireless communication for use with a computing device conducted according to the principles of the present invention.

Turning now to FIG. 7, illustrated is an embodiment of a method of performing wireless communication, generally designated 700, for use with a computing device conducted according to the principles of the present invention. The method 700 first performs an initialization in a step 705. After initialization, the method 700 then determines whether to receive radio communication signals or transmit radio communication signals in a decisional step 710. If the method 700 is to receive, the method 700 then receives radio communication signals in a step 720. In one embodiment, the method 700 may employ a wireless communication module positioned distal from a computer motherboard of the computing device. The wireless communication module may include an antenna and a radio module configured to employ the antenna to transmit and receive radio communication signals. In a related embodiment, the wireless communication module may be the wireless communication module 510 of FIG. 5. In another related embodiment, the wireless communication module may be the wireless communication module 610 of FIG. 6.

Next, the method 700 converts the received radio communication signals to intermediate data in a step 725. In one embodiment, the intermediate data may be digital signals. See FIG. 5 for discussion of converting radio communication signals into intermediate data that are digital signals. In an alternate embodiment, the intermediate data may be analog information suitable for processing by a wireless module interface on the computer motherboard, such as In-Phase and Quadrature phase analog signals. See FIG. 6 for discussion of converting radio communication signal into intermediate data that are analog information.

The method 700 then sends the intermediate data to a wireless module interface that is coupled to the motherboard of the computer device in a step 730. In one embodiment, the method 700 may send the intermediate data via a wired interface, such as the wired interface 540 of FIG. 5 or the wired interface 640 of FIG. 6. Next the method 700 converts the intermediate data to raw digital data in a step 735. The method 700, in one embodiment, may employ a wireless module interface to convert the data that is similar to the wireless module interface 560 of FIG. 5. In another embodiment, the method 700 may employ a wireless module interface to convert the data that is similar to the wireless module interface 660 of FIG. 6. The method 700 then transmits the raw digital data to the computer motherboard for further processing in a step 740. Next, the method 700 returns to determine whether to receive or transmit in the decisional step 710.

If the method 700 determined that it is to transmit radio communication signals in the decisional step 710, the method 700 then receives raw digital data from the computer motherboard in a step 750. Next, the method 700 converts the raw digital data to intermediate data in a step 755. In one embodiment, the intermediate data may be digital signals. In another embodiment, the intermediate data may be analog information that is suitable for processing by a wireless communication module. The method 700 may employ a wireless module interface to convert the raw digital data that is similar to the wireless module interface 560 of FIG. 5. In an alternate embodiment, the method 700 may employ a wireless module interface to covert the raw digital data that is similar to the wireless module interface 660 of FIG. 6.

The method 700 then sends the intermediate data to the wireless communication module in a step 760. The method 700 may send the intermediate data via a wired interface, such as the wired interface 540 of FIG. 5 or the wired interface 640 of FIG. 6. Next, the method 700 converts the intermediate data to radio communication signals in a step 765. The method 700, in one embodiment, may employ the wireless communication module 510 of FIG. 5 to convert the intermediate data. In an alternative embodiment, the method 700 may employ the wireless communication module 610 of FIG. 6 to convert the intermediate data. The method 700 then transmits the radio communication signals in a step 770. Next the method 700 returns to determine whether to receive or transmit in the decisional step 710.

One skilled in the art should know that the present invention is not limited to only performing one receive and one transmit method at a time. The present invention and method may perform multiple functions at the same time. In addition, the present invention is not limited to only the types of intermediate data described above. In other embodiments, the present invention and method may convert to different types of intermediate data depending upon the type of transmission being perform and/or the type of transmission medium employed. Also, other embodiments of the present invention may have additional or fewer steps than described above.

While the methods disclosed herein have been described and shown with reference to particular steps performed in a particular order, it will be understood that these steps may be combined, subdivided, or reordered to form an equivalent method without departing from the teachings of the present invention. Accordingly, unless specifically indicated herein, the order and/or the grouping of the steps are not limitations of the present invention.

Although the present invention has been described in detail, those skilled in the art should understand that they can make various changes, substitutions and alterations herein without departing from the spirit and scope of the invention in its broadest form.

What is claimed is:

1. A wireless communication module system, for use with a portable personal computer (PC) having a motherboard and an integral display screen, comprising:
   a single wired interface having first and second ends and configured to transmit raw digital data therebetween, said first end coupled to said motherboard, said second end coupled to said integral display screen and providing an external connection port physically accessible to a user during operation of said portable personal computer (PC); and
   a wireless communication module, including:
      an antenna,
      an interface port removably coupled via a cable to said connection port, and
      a transceiver configured to employ said antenna to transmit and receive radio communication signals, said transceiver further configured to employ said interface port to communicate said raw digital data with said motherboard via said single wired interface and wherein said transceiver includes:
         a radio frequency modulator/demodulator;
         a coder/decoder (Codec) coupled to said radio;
         a baseband processor coupled to said Codec; and
         a media access controller coupled to said baseband processor configured to employ said interface port to communicate said raw digital data with said motherboard.

2. The wireless communication module system as recited in claim 1 wherein said wireless communication module is detachably couplable to said integral display screen employing said interface port and adapted to be positioned distal to said motherboard so that interference is reduced.

3. The wireless communication module system as recited in claim 1 wherein said connection port provides power to said wireless communication module.

4. The wireless communication module system as recited in claim 1 wherein said wireless communication module is positioned into an integrated receptacle of said integral display screen.

5. The wireless communication module system as recited in claim 1 wherein said connection port is located in a position distal from said motherboard such that said wireless communication module is less susceptible to interference from said motherboard.

6. The wireless communication module system as recited in claim 1 wherein said single wired interface includes multiple conductors therein.

7. The wireless communication module system as recited in claim 6 wherein said connection port is a standard connection port selected from the group consisting of:
- a universal serial bus (UBS);
- a universal serial bus 2 (USB2);
- a FireWire;
- a Fire Wire 2;
- an SD Memory Card (SDI/O); and
- an optical port.

8. The wireless communication module system as recited in claim 1 wherein said wireless communication module is selected from the group consisting of:
- a wireless Local Area Network (LAN) communications module;
- a cellular communications module; and
- a satellite communications module.

9. A method for performing a wireless communication for use with a portable personal computer having a motherboard and an integral display screen, comprising:
- employing a single wired interface having first and second ends to receive and transmit raw digital data with said motherboard, said first end coupled to said motherboard, said second end coupled to said integral display screen and providing an external connection port physically accessible to a user during operation of said portable personal computer; and
- performing said wireless communication with a wireless communication module, said wireless communication module including:
  - an antenna,
  - an interface port removably coupled to said connection port via a cable, and
  - a transceiver configured to employ said antenna to transmit and receive radio communication signals, said transceiver further configured to employ said interface port to communicate said raw digital data with said motherboard via said single wired interface and wherein said transceiver includes:
    - a radio frequency modulator/demodulator;
    - a coder/decoder (Codec) coupled to said radio;
    - a baseband processor coupled to said Codec; and
    - a media access controller coupled to said baseband processor configured to employ said interface port to communicate said raw digital data with said motherboard.

10. The method as recited in claim 9 wherein said wireless communication module is detachably couplable to said integral display screen employing said interface port and adapted to be positioned distal from said motherboard so that interference is reduced.

11. The method as recited in claim 9 further comprising providing power to said wireless communication module via said connection port.

12. The method as recited in claim 9 further comprising positioning said wireless communication module into an integrated receptacle of said integral display screen.

13. The method as recited in claim 9 further comprising locating said connection port in a position distal from said motherboard such that said wireless communication module is less susceptible to interference from said motherboard.

14. The method as recited in claim 9 wherein said employing said single wired interface comprises employing said single wired interface having multiple conductors therein.

15. The method as recited in claim 14 wherein said providing said externally accessible connection port comprises providing a standard connection port selected from the group consisting of:
- a universal serial bus (UBS);
- a universal serial bus 2 (USB2);
- a FireWire;
- a FireWire 2;
- an SD Memory Card (SDI/O); and
- an optical port.

16. The method as recited in claim 9 wherein performing said wireless communication comprises performing said wireless communication with a wireless communication module selected from the group consisting of:
- a wireless Local Area Network (LAN) communications module;
- a cellular communications module; and
- a satellite communications module.

17. A wireless communication system, for use with a digital network, comprising:
- a wireless interface configured to provide an interface to said digital network; and
- at least one wireless portable personal computer (PC) interfaced with said digital network via said wireless interface, said wireless portable PC including:
  - a motherboard and an integral display screen,
  - a single wired interface having first and second ends and configured to transmit raw digital data therebetween, said first end coupled to said motherboard, said second end coupled to said integral display screen and providing an external connection port physically accessible to a user during operation of said wireless portable PC, and
  - a wireless communication module, including:
    - an antenna,
    - an interface port removably coupled to said connection port via a cable, and
    - a transceiver configured to employ said antenna to transmit and receive radio communication signals, said transceiver further configured to employ said interface port to communicate said raw digital data with said motherboard via said single wired interface and wherein said transceiver includes:
      - a radio frequency modulator/demodulator;
      - a coder/decoder (Codec) coupled to said radio;
      - a baseband processor coupled to said Codec; and
      - a media access controller coupled to said baseband processor configured to employ said interface port to communicate said raw digital data with said motherboard.

18. The wireless communication system as recited in claim 17 wherein said wireless communication module is detachably couplable to said integral display screen and adapted to be positioned distal to said motherboard employing said cable so that interference is reduced.

19. The wireless communication system as recited in claim 17 wherein said connection port provides power to said wireless communication module.

20. The wireless communication system as recited in claim 17 wherein said wireless communication module is positioned into an integrated receptacle of said integral display screen.

21. The wireless communication system as recited in claim 17 wherein said connection port is located in a position distal from said motherboard such that said wireless communication module is less susceptible to interference from said motherboard.

22. The wireless communication system as recited in claim 17 wherein said single wired interface includes multiple conductors therein, and wherein said connection port is a connection port selected from the group consisting of:
- a universal serial bus (UBS);
- a universal serial bus 2 (USB2);
- a FireWire;
- a FireWire 2;
- an SD Memory Card (SDI//O); and
- an optical port.

23. The wireless communication system as recited in claim 17 wherein said wireless communication is selected from the group consisting of:
- a wireless Local Area Network (LAN) communications module;
- a cellular communications module; and
- a satellite communications module.

24. A wireless communication module system, for use with a computing device having an encasing and a motherboard therein, comprising:
- a single wired interface having first and second ends and configured to transmit raw digital data therebetween, said first end coupled to said motherboard, said second end coupled to an external connection port physically accessible to a user during operation of said computing device and located on said encasing at a position distal from said motherboard; and
- a wireless communication module, including:
  - an antenna,
  - an interface port removably coupled to said connection port via a cable, and
  - a transceiver configured to employ said antenna to transmit and receive radio communication signals, said transceiver further configured to employ said interface port to communicate said raw digital data with said motherboard via said single wired interface, and said wireless communication module adapted to be positioned distal to said motherboard employing said cable so that interference is reduced, wherein said transceiver includes:
    - a radio frequency modulator/demodulator;
    - a coder/decoder (Codec) coupled to said radio;
    - a baseband processor coupled to said Codec; and
    - a media access controller coupled to said baseband processor configured to employ said interface port to communicate said raw digital data with said motherboard.

25. The wireless communication module system as recited in claim 24 wherein said wireless communication module is detachably couplable to said encasing.

26. The wireless communication module system as recited in claim 24 wherein said connection port provides power to said wireless communication module.

27. The wireless communication module system as recited in claim 24 wherein said wireless communication module is positioned into an integrated receptacle of said encasing.

28. The wireless communication module system as recited in claim 24 wherein said device is a personal data assistant (PDA), a portable computer, or a household appliance.

29. The wireless communication module system as recited in claim 24 wherein said single wired interface includes multiple conductors therein.

30. The wireless communication module system as recited in claim 29 wherein said connection port is a standard connection port selected from the group consisting of:
- a universal serial bus (UBS);
- a universal serial bus 2 (USB2);
- a FireWire;
- a FireWire 2;
- an SD Memory Card (SDI/O); and
- an optical port.

31. The wireless communication module system as recited in claim 24 wherein said wireless communication module is selected from the group consisting of:
- a wireless Local Area Network (LAN) communications module;
- a cellular communications module; and
- a satellite communications module.

32. A wireless communication module system, for use with a computing device having an encasing and a motherboard therein, comprising:
- a wireless module interface coupled to said motherboard and configured to receive and transmit raw digital data with said motherboard, said wireless module interface is further configured to convert between said raw digital data and analog intermediate data for wireless network communication;
- a wired interface having first and second ends and configured to transmit said analog intermediate data therebetween, said first end coupled to said wireless module interface, said second end coupled to an externally accessible connection port located on said encasing at a position distal from said motherboard; and
- a wireless communication module, including:
  - an antenna,
  - an interface port removably coupled to said connection port via a cable, and
  - a radio module configured to employ said antenna to transmit and receive radio communication signals, said radio module further configured to employ said interface port to communicate with said wireless module interface and to convert between said radio communication signals and said analog intermediate data, said radio module is adapted to be positioned distal to said motherboard so that interference is reduced.

33. The wireless communication module system as recited in claim 32 wherein said radio module includes a radio frequency modulator/demodulator.

34. The wireless communication module system as recited in claim 32 wherein said wireless module interface includes a media access controller configured to communicate with said motherboard and having:
- a coder/decoder (Codec) coupled to said wired interface, and
- a baseband processor coupled to said Codec.

35. The wireless communication module system as recited in claim 32 wherein said wireless communication module is detachably couplable to said encasing.

36. The wireless communication module system as recited in claim 32 wherein said connection port provides power to said wireless communication module.

37. The wireless communication module system as recited in claim 32 wherein said wireless communication module is positioned into an integrated receptacle of said encasing.

38. The wireless communication module system as recited in claim 32 wherein said device is a personal data assistant (PDA), a portable computer, or a household appliance.

39. The wireless communication module system as recited in claim 32 wherein said connection port is a standard connection port selected from the group consisting of:
a universal serial bus (UBS);
a universal serial bus 2 (USB2);
a FireWire;
a FireWire 2;
an SD Memory Card (SDI/O); and
an optical port.

40. The wireless communication module system as recited in claim 32 wherein said wireless communication module is selected from the group consisting of:
a wireless Local Area Network (LAN) communications module;
a cellular communications module; and
a satellite communications module.

41. A method of performing wireless communication for use with a computing device having an encasing and a motherboard therein, comprising:
receiving and transmitting raw digital data between said motherboard and a wireless module interface coupled to said motherboard, and converting between said raw digital data and analog intermediate data for wireless network communication;
employing a wired interface having first and second ends to receive and transmit said analog intermediate data between said wireless module interface and an externally accessible connection port, said first end coupled to said wireless module interface, said second end coupled to said externally accessible connection port located on said encasing at a position distal from said motherboard; and
employing a wireless communication module to communicate to a wireless network, said wireless communication module including:
an antenna,
an interface port removably coupled to said connection port via a cable, and
a radio module configured to employ said antenna to transmit and receive radio communication signals, said radio module further configured to employ said interface port to communicate with said wireless module interface and to convert between said radio communication signals and said analog intermediate data, said radio module is adapted to be positioned distal to said motherboard so that interference is reduced.

42. The method as recited in claim 41 wherein said radio module includes a radio frequency modulator/demodulator.

43. The method as recited in claim 41 wherein said wireless module interface includes a media access controller configured to communicate with said motherboard and having:
a coder/decoder (Codec) coupled to said wired interface, and
a baseband processor coupled to said Codec.

44. The method as recited in claim 41 wherein said wireless communication module is detachably couplable to said encasing.

45. The method as recited in claim 41 further comprising providing power to said wireless communication module via said connection port.

46. The method as recited in claim 41 further comprising positioning said wireless communication module into an integrated receptacle of said encasing.

47. The method as recited in claim 41 wherein said device is a personal data assistant (PDA), a portable computer, or a household appliance.

48. The method as recited in claim 41 wherein said connection port is a standard connection port selected from the group consisting of:
a universal serial bus (UBS);
a universal serial bus 2 (USB2);
a FireWire;
a FireWire 2;
an SD Memory Card (SDI/O); and
an optical port.

49. The method as recited in claim 41 wherein said wireless communication module is selected from the group consisting of:
a wireless Local Area Network (LAN) communications module;
a cellular communications module; and
a satellite communications module.

50. The wireless communication module system of claim 32 wherein said externally accessible connection port is physically accessible to a user during operation of said computing device.

51. The method as recited in claim 41 wherein said externally accessible connection port is physically accessible to a user during operation of said computing device.

* * * * *